United States Patent
Sharma

(10) Patent No.: US 8,082,047 B1
(45) Date of Patent: Dec. 20, 2011

(54) ADAPTIVE CONTROL METHOD THAT COMPENSATES FOR SIGN ERROR IN ACTUATOR RESPONSE

(75) Inventor: Manu Sharma, Signal Hill, CA (US)

(73) Assignee: The Boeing Company, Chicago, IL (US)

(*) Notice: Subject to any disclaimer, the term of this patent is extended or adjusted under 35 U.S.C. 154(b) by 278 days.

(21) Appl. No.: 12/615,169

(22) Filed: Nov. 9, 2009

(51) Int. Cl.
*G06F 19/00* (2011.01)
*G05B 13/02* (2006.01)

(52) U.S. Cl. .............. 700/54; 700/79; 701/3; 701/4; 244/164

(58) Field of Classification Search .............. 700/54, 700/79; 701/3, 4; 244/164
See application file for complete search history.

(56) References Cited

U.S. PATENT DOCUMENTS

| | | | |
|---|---|---|---|
| 3,937,423 A | 2/1976 | Johansen | |
| 5,452,869 A | 9/1995 | Basuthakur et al. | |
| 6,539,290 B1 * | 3/2003 | Vos | 701/3 |
| 6,607,167 B2 * | 8/2003 | Wang et al. | 244/172.7 |
| 6,714,899 B2 * | 3/2004 | Kassmann | 703/2 |
| 7,593,793 B2 | 9/2009 | Lavretsky et al. | |
| 7,769,703 B2 * | 8/2010 | Calise et al. | 706/23 |
| 2003/0010871 A1 * | 1/2003 | Wang et al. | 244/173 |
| 2003/0199997 A1 * | 10/2003 | Gao | 700/18 |
| 2004/0078120 A1 * | 4/2004 | Melkers et al. | 701/3 |
| 2007/0055392 A1 * | 3/2007 | D'Amato et al. | 700/44 |
| 2010/0030716 A1 * | 2/2010 | Calise et al. | 706/23 |

OTHER PUBLICATIONS

"Structured Adaptive Model Inversion Control with Actuator Saturation Constraints Applied to Tracking Spacecraft Maneuvers", Tandale et al, Proceeding of the 2004 American Control Conference, 2004.*
"Large angle attitude control of spacecraft with actuator saturation", Bang et al, Control Engineering Practice 11, 2003.*
"Nonlinear Attitude Control for a Rigid Spacecraft by Feedback Linearization", Bang et al, KSME International Journal, vol. 18, No. 2, pp. 203-210, 2004.*
Nussbaum, R. D., "Some remarks on a conjecture in parameter adaptive control," Systems & Control Letters, 3, (1983), pp. 243-246.

* cited by examiner

*Primary Examiner* — Michael D Masinick
(74) *Attorney, Agent, or Firm* — Ostrager Chong Flaherty & Broitman P.C.

(57) ABSTRACT

An adaptive control method that provides the ability to address control uncertainties in both the sign and magnitude of the control power of the system to ensure stability and command tracking. The adaptive control system also functions correctly and remains internally stable in spite of control limits. The control system has the following elements: (i) a filter that smoothes the command to the plant and modifies the command when a control limit is reached, (ii) an element that receives command error input and constructs a nonlinear function of the accumulated error, (iii) an element that converts the nonlinear function of the accumulated error into a control signal to be added to the output of a baseline control system, and (iv) an element that computes the difference between the actuator command and the maximum achievable output.

20 Claims, 3 Drawing Sheets

ADAPTIVE CONTROL METHOD THAT COMPENSATES FOR SIGN ERROR IN ACTUATOR RESPONSE

BACKGROUND

This invention generally relates to automatic methods for ensuring stability of a control system for which the direction and magnitude of the response to a command input is unknown or uncertain.

As used herein, the term "control system" means a device or set of devices that manage, command, direct or regulate the behavior of other devices, equipment or systems (hereinafter "plant"). Although the embodiment disclosed herein has particular application to control of the rotation of a spacecraft about an axis, the control method disclosed and claimed herein has application to plant other than spacecraft, such as electric motors or servomechanisms.

Adaptive control offers excellent robustness to errors in control actuator magnitude and misalignment. These errors can stem from a host of sources such as mischaracterization of the control actuators, misalignment during assembly, and failures or degradation in the hardware. Additionally, there have been developments on using adaptive control to provide robustness to errors in the sign on the control actuator.

While not common, there have been several space missions that have encountered such an error, which can be caused by incorrect mounting of the hardware or miswiring during assembly. Correcting for this error requires substantial ground intervention since the typical attitude control law will destabilize the closed loop system under a sign error.

In particular, there have been instances where a reaction wheel of a spacecraft has been miswired during assembly, causing the reaction wheel to respond in the opposite direction to the commanded direction. One solution to this problem is to perform detailed ground testing to verify correct installation of control actuators, such as reaction wheels, as well as to characterize their effectiveness. However, ground testing does not always detect a reversed actuator.

Another solution is to perform on-orbit testing by sending open-loop commands to the spacecraft to either verify the expected response and/or perform system identification using the response. On-orbit open-loop testing and identification requires ground interaction which is cost and schedule intensive. In one known instance, reaction wheel miswiring on a spacecraft required substantial ground intervention to correct.

Without ground intervention, a reversed reaction wheel will result in system instability and potential loss of the spacecraft. Therefore it would be advantageous to provide an autonomous feedback control system to adapt to such error, thereby safeguarding against a potentially catastrophic loss.

Thus, there is a need for an adaptive control method that provides the ability to address control uncertainties in both the sign and magnitude of the control power of the system to ensure stability and command tracking. The adaptive control system must also function correctly and remain internally stable in spite of control limits, e.g., maximum reaction wheel torque.

BRIEF SUMMARY

The novel features of the control method disclosed herein include the capability to autonomously deal with errors on the sign and magnitude of the control power of an actuator, maintain stability in the presence of control power limits of the actuator, and allow for retrofit to currently used control system architectures as a backup. The ability to remain internally stable in spite of control power limits is of critical importance to practical application of any control system because all physical actuators have limits. The possibility to retrofit this control system to an existing control system allows it to act as a backup or fail-safe mechanism.

The elements of the control system disclosed herein include the following: (i) a filter that smoothens the command to the plant and modifies the command when a control limit is reached; (ii) an element that receives a command tracking error and constructs a nonlinear function of the accumulated error; (iii) an element that converts the nonlinear function of the accumulated error into a control signal to be added to the output of the baseline control system, and (iv) an element that computes the difference between the actuator command, e.g., reaction wheel torque, and the achieved output. Optionally a saturation function can be used to estimate achieved output. Alternatively, some systems provide a measurement or estimate of achieved output.

One aspect of the invention is an adaptive control system for controlling a plant, comprising: a command filter that modifies a raw plant reference command to remove the effect of actuator saturation when a control limit is reached, the command filter outputting a filtered command and a time rate signal representing a time rate of the filtered command; a linear controller that outputs a linear control signal component, the linear control signal component being a function of the time rate signal and a command tracking error signal; control-reversal compensation means that output a nonlinear control signal component, the nonlinear control signal component being a function of the time rate signal and the command tracking error signal; and a summer for outputting an actuator command that is a sum of the linear and nonlinear control signal components.

Another aspect of the invention is a method for adaptive control of a plant comprising the following steps: filtering a raw plant reference command to remove the effect of actuator saturation when a control limit is reached; outputting a filtered command and a time rate signal representing a time rate of the filtered command; generating a linear control signal component that is a function of the time rate signal and a command tracking error; computing a nonlinear function of an accumulated command tracking error; converting the nonlinear function into a nonlinear control signal component; summing the nonlinear control component and the linear control component to form an actuator command; and outputting the actuator command to an actuator.

A specific application of the concept of the invention involves a spacecraft comprising a reaction wheel and an adaptive control signal processing system for controlling a spacecraft, the adaptive control signal processing system being programmed to perform the following steps: filtering a raw command reference to remove the effect of reaction wheel saturation when a control limit is reached; outputting a filtered command and a time rate signal representing a time rate of the filtered command; generating a linear control signal component that is a function of the time rate signal and a command tracking error; computing a nonlinear function of an accumulated command tracking error; converting the nonlinear function into a nonlinear control signal component; summing the linear and nonlinear control signal components to form a control signal; and then outputting the control signal to the reaction wheel.

Other aspects of the invention are disclosed and claimed below.

BRIEF DESCRIPTION OF THE DRAWINGS

Reference will hereinafter be made to the drawings in which similar elements in different drawings bear the same reference numerals.

DETAILED DESCRIPTION

Figure 1:
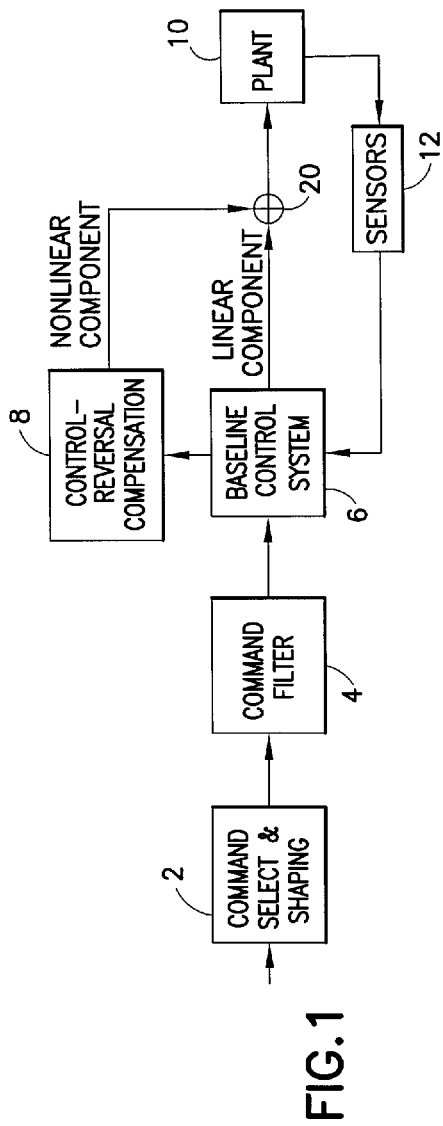
FIG. 1 is a block diagram showing a control system that incorporates control-reversal compensation in accordance with the invention.

FIG. 1 is a block diagram showing components (2, 4, 6, 8 and 20) of a control system for controlling a plant 10 for some particular mechanical operation or process, such as a spacecraft, a servomechanism, an electric motor, etc. More specifically, this control system outputs a signal representing a command for a control actuator (also known as a "control effector") of plant 10. The state of the plant, e.g., the angular rotation rate about a selected axis, is detected by sensors 12, which feed that state data to a baseline control system 6, e.g., a linear control system.

The adaptive control system seen in FIG. 1 comprises a conventional command selection and shaping functional block 2. The programming comprises logic for selecting a command and logic for shaping the selected command. The selected and shaped command is outputted to a command filter 4 that smoothes the command and modifies the command when a control limit is reached. More specifically, the command is filtered in a special way to remove the effect of actuator saturation (if any). The filtered command is outputted to the baseline control system 6, which may be of a type that provides command-tracking control using command rate as a feedforward term.

The adaptive control system seen in FIG. 1 further comprises a control-reversal compensation functional block 8 that receives command error input, constructs a nonlinear function of the accumulated error, and then converts the weighted error into a nonlinear control signal component. That nonlinear control signal component is outputted to a summing junction 20, which adds the nonlinear output to the linear control signal component output by the baseline control system 6. The sum of the linear and nonlinear control signal components (i.e., the "actuator command") is outputted to the control actuator of the plant 10. In the following discussion it will be assumed that the control actuator is a reaction wheel of a spacecraft.

Consider the following plant, resembling a single-axis spacecraft, $$\dot{\omega} = bu$$

where b represents the gain on control input that is uncertain in both sign and magnitude. Let $u_c$ represent the actuator command, and $\delta(u) = u - u_c$ be the difference between the commanded and the achieved control, e.g. due to physical actuator control limits. Then, $$\dot{\omega} = bu_c + b\delta(u)$$

Let the command filter be constructed as $$\dot{\omega}_c = \frac{1}{r}(-\omega_c + \omega_r) + \frac{1}{N'(r)}\delta(u)$$

where $$N'(r) = sgn(N(r))\max(|N(r)|, \underline{N})$$

and $\underline{N}$ is a constant. Additionally, define $$\dot{\omega}'_c = \frac{1}{t}(-\omega_c + \omega_r)$$

where $\tau$ is a constant. Then the control is constructed as $$u_c = N(r)\phi(\tilde{\omega}, \dot{\omega}'_c)$$

where $\tilde{\omega} = \omega - \omega_c$ represents the command tracking error, $$\phi(\tilde{\omega}, \dot{\omega}_c) = -k\tilde{\omega} + \dot{\omega}'_c$$

and $$\dot{r} = \phi\tilde{\omega}$$

$$N(r) = r^2 \sin r + \frac{1}{\hat{b}}$$

where $\hat{b}$ is an estimate of the control gain b.

Additionally it should be noted that the actuator command $u_c$ can be viewed as being composed of a linear signal component and a nonlinear signal component. The linear signal component is given by $$\frac{1}{\hat{b}}\phi = \frac{1}{\hat{b}}[-k\tilde{\omega} + \dot{\omega}'_c]$$

and the nonlinear signal component is given by $$\left(N(r) - \frac{1}{\hat{b}}\right)\phi = \phi r^2 \sin r$$

The efficacy of the approach disclosed herein has been illustrated using a reduced-order, nonlinear model that captures the essence of the spacecraft dynamics. A block diagram illustrating the augmentation (or retrofit) of the adaptive control element is shown in FIG. 2.

Figure 2:
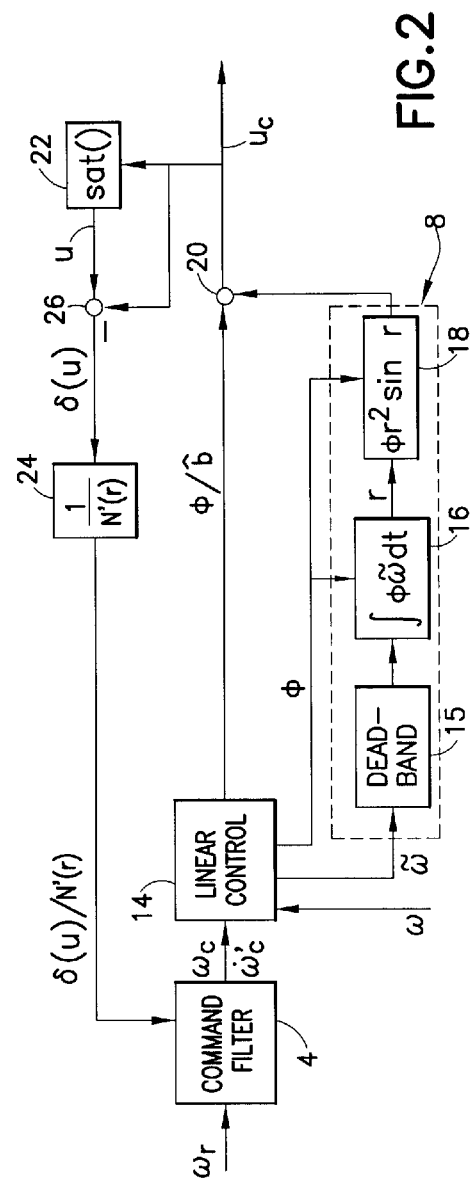
FIG. 2 is a block diagram illustrating the augmentation (or retrofit) of an adaptive control element in accordance with one embodiment.

As seen in FIG. 2, the command filter 4 receives a reference command signal $\omega_r$ representing an instruction that the spacecraft rotate at a desired angular rate. The command filter also receives an anti-windup signal $\delta(u)/N'(r)$ from a saturation functional block 22 (the saturation function is optional), where $\delta(u)$ is the difference between the actuator command $u_c$ and the achieved control u. The command filter uses $\delta(u)/N'(r)$ to remove the effect of actuator saturation. The command filter 4 outputs a filtered command $\omega_c$ and the time rate $\dot{\omega}'_c$ of the filtered command to a linear controller 14. The filtered command $\omega_c$ represents the state of the filter, i.e., it is the current value in filter memory that is accumulated internally; it is also part of the filter output.

The linear controller 14 is a typical command-tracking control using the command rate $\dot{\omega}'_c$ as a feedforward term.

The linear controller 14 also receives a feedback signal ω from a sensor, which signal represents the achieved angular rate of the spacecraft. The linear control system outputs a linear control signal component $\Phi/\hat{b}$ to the summing junction 20. The linear controller 14 outputs a signal representing the command tracking error $\tilde{\omega}$ to an integrator 16 via a dead-zone switching function 15 (optional) and outputs a signal representing the parameter $\Phi$ to both the integrator 16 and a computation block 18. The dead-zone switching function passes the command tracking error $\tilde{\omega}$ to the integrator 16 unchanged if $\tilde{\omega}$ is greater than a preselected threshold, or outputs a zero value to the integrator 16 if $\tilde{\omega}$ is less than that preselected threshold. The integrator 16 constructs a nonlinear function $\int \phi \omega dt$ of the accumulated error and outputs a weighted error signal r. Computation block 18 uses the weighted error signal r from integrator 16 and the signal representing parameter $\Phi$ from linear controller 14, converting the weighted error signal r into a nonlinear control signal component using the function $\Phi r^2 (\sin r)$. This function has a nonlinear gain that is constructed to provide control-reversal compensation. Dead-zone switching function 15, Integrator 16 and computation block 18 are components of the control-reversal compensation functional block 8, previously described with reference to FIG. 1.

The nonlinear control signal component ($\Phi r^2 \sin r$) is outputted from block 18 to the summing junction 20, where it is summed with the linear control signal component $\Phi/\hat{b}$ from the linear controller 14. The output of the summing junction 20 is the actuator command $u_c$.

The benefit of the deadzone is that it allows the designer an additional degree of freedom to ensure the quiescence of the nonlinear components if the tracking error $\tilde{\omega}$ is within the deadzone. The implication of this is that if the linear control 14 is doing its job as expected, it is as if the control-reversal compensation means for producing the nonlinear component are not even present. However, the moment that the linear control becomes insufficient, as gauged by the deadzone, the control-reversal compensation means for producing the nonlinear component become active and provide compensation.

The latter would be the scenario in the event of a sign reversal. The linear control would actually attempt to drive the plant in the opposite direction of its command, causing the tracking error $\tilde{\omega}$ to grow. Once $\tilde{\omega}$ becomes larger than the deadzone threshold, the nonlinear elements would grow to overpower the linear control, stabilize the plant, and bring the tracking error back down. At some point the tracking error would become small enough that it goes back into the deadzone and at this point the parameter r will become constant again. N(r) will converge to 1/b over time given sufficient excitation.

Alternatively, the deadzone switching function can be omitted, in which case the control-reversal compensation means 16 and 18 would operate, even when $\tilde{\omega}$ is small, to produce a nonlinear component that is added to the linear component at summing junction 20, the result being the actuator command $u_c$.

Optionally, the actuator command $u_c$ is inputted to a saturation element 22 which is designed to estimate the achieved control u. This saturation element is well-known in the art. The saturation element 22 clips the actuator command $u_c$ if it exceeds a maximum achievable output $u_{max}$. The achievable output has a maximum value due to either bounded power of the actuator or to the physical constraints of the actuator. The output u of saturation element 22 represents the estimated achieved control acting on the plant. The output u is determined by the saturation element 22 as follows: if $u_c < u_{min}$, then $u = u_{min}$; if $u_{min} \leq u_c \leq u_{max}$, then $u = u_c$; and if $u_c > u_{max}$, then $u = u_{max}$. Thus the saturation element 22 ensures that u is between its maximum and minimum values.

The values $-u_c$ and u are summed in a summing junction 26 to produce the difference $\delta(u) = u - u_c$. The difference $\delta(u)$ is inputted to functional block 24, where it is weighted by a factor $1/N'(r)$. The resulting anti-windup, $\delta(u)/N'(r)$, is sent to the command filter 14, as previously described.

The goal of this anti-windup measure is to counteract the integration of the nonlinear functional component 16 while the actuator is saturated.

In the case of a sign error, the command tracking error $\tilde{\omega}$ will increase rapidly. Likewise the parameter r, which is a function $\tilde{\omega}$, will increase rapidly, thereby increasing the magnitude of the nonlinear control signal component. Optionally, the augmentation algorithm can be designed to effectively disable the adaptive control by incorporating a dead-band which will result in no (i.e., zero) nonlinear component if $\tilde{\omega}$ is small. This feature would have the effect of switching the adaptation on and off depending on the magnitude of the command tracking error $\tilde{\omega}$.

The adaptive control augmentation algorithm depicted in FIG. 2 can be implemented in software and executed by a processor. In the case of an orbiting spacecraft that has a control effector, such as a reaction wheel, whose response has errors in sign and magnitude, the spacecraft can be retrofitted by uploading the adaptive control augmentation algorithm from the ground to the spacecraft.

Figure 3:
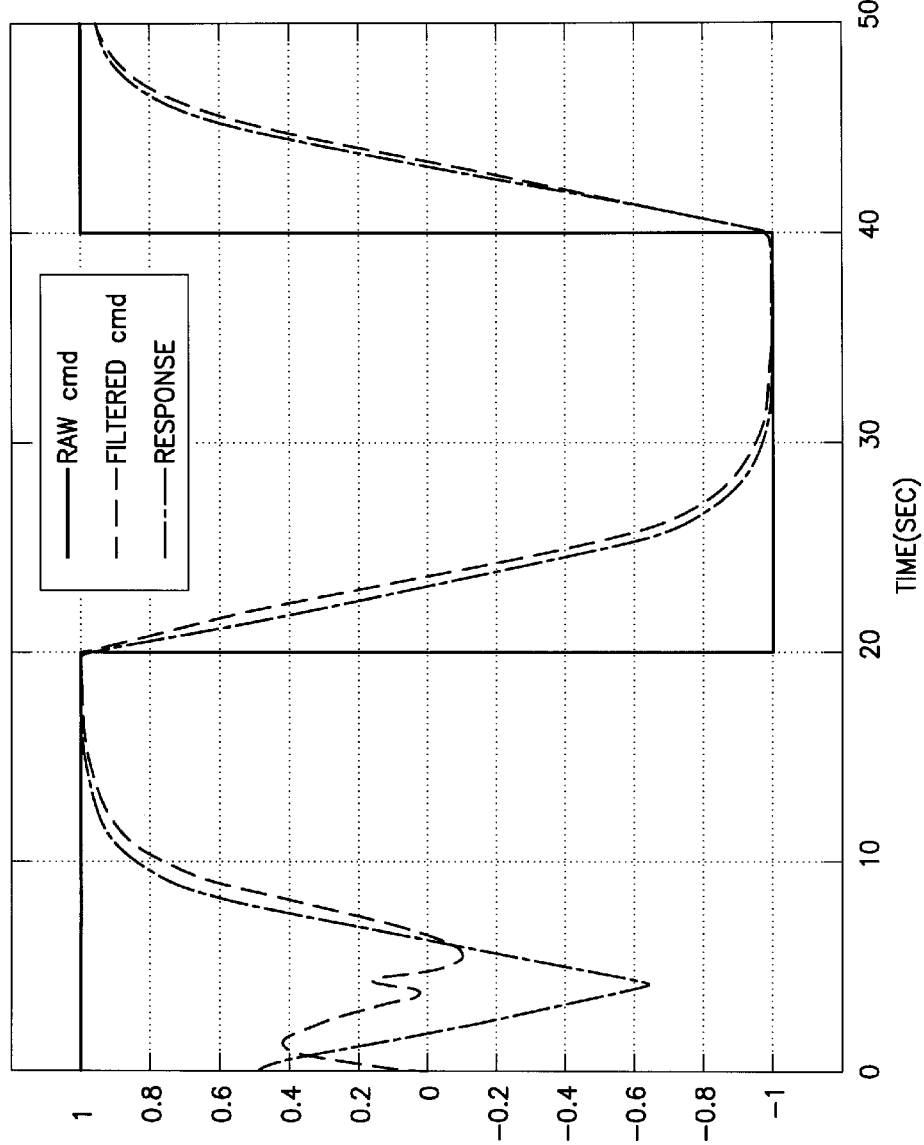
FIG. 3 is a graph showing simulation results for command tracking under control sign reversal and control power error of 20%.
Figure 4:
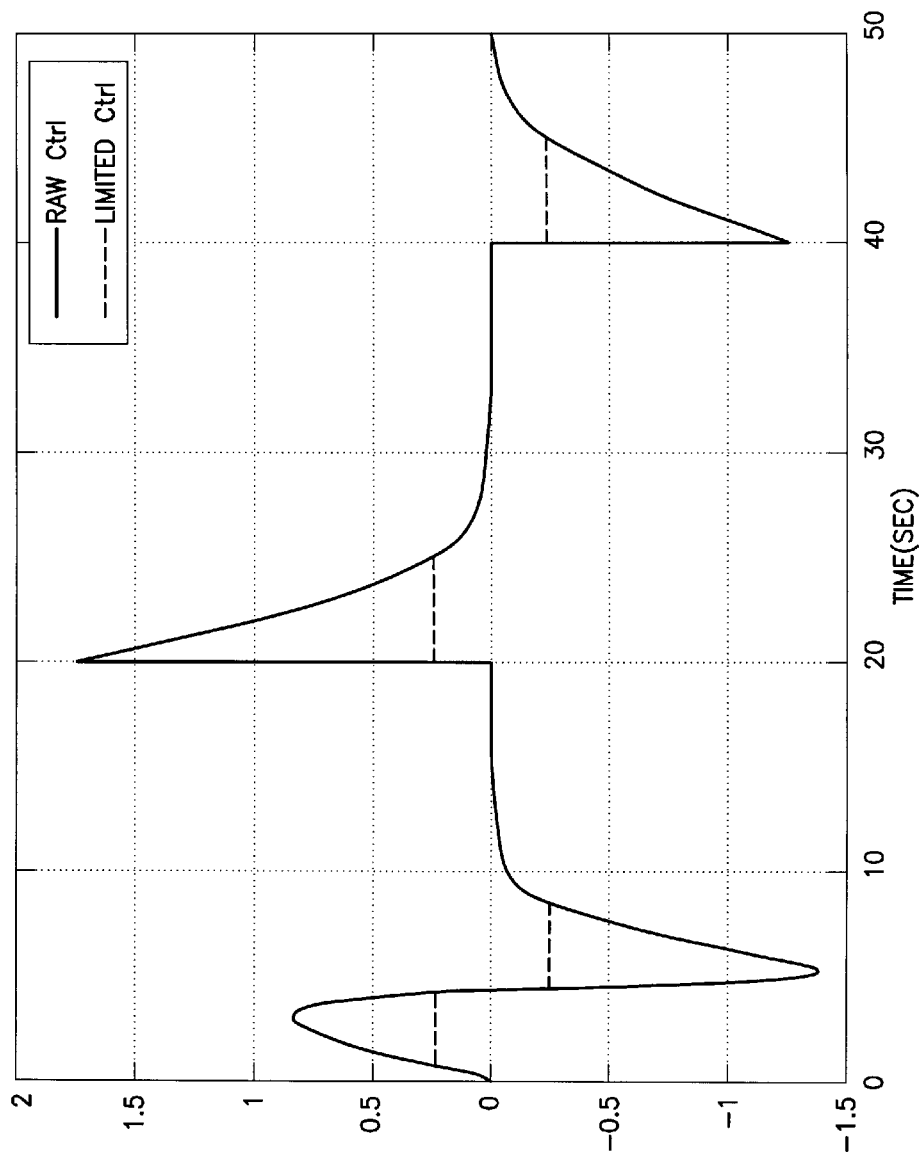
FIG. 4 is a graph showing simulation results for control signals under control sign reversal and control power error of 20%.

The invention has been tested using analysis and simulation. The simulation results, given in FIGS. 3 and 4, show that the adaptive control method disclosed herein can autonomously correct for a sign error on the control as well as a 20% error in control power with no a priori knowledge. The error in control sign is evidenced by the plant response initially moving in the opposite direction of the raw reference command. However, after a few seconds the adaptation compensates for the errors and the expected command following ensues. Additionally, FIG. 3 shows that while control saturation is frequently encountered, the anti-windup mechanism disclosed herein keeps the adaptive control integrators bounded, and the closed-loop system remains stable. The filtered command is modified to keep the control system stable in the presence of control limiting. Thus, FIGS. 3 and 4 show that the adaptive control system disclosed herein is able to correct for the error and that after an initial transient, the system is able to provide good command tracking.

The adaptive control scheme disclosed herein provides increased mission assurance, and cost and time savings if control and health of a spacecraft are maintained. This invention provides a failsafe mechanism to automatically prevent plant, e.g., spacecraft, from going unstable if a control mechanism is mounted in reverse. It also provides quicker recovery to nominal operation if a fault is discovered. The latter in particular implies the spacecraft is more likely to enter service on time.

The ability of adaptive control to address control uncertainties (both magnitude and sign) is of particular relevance today. Traditional development of spacecraft requires several years to meticulously evaluate and refine the design, followed by careful in-orbit testing to check out all subsystems, with ground carefully coordinating the test and on hand to address any anomalies. Conversely, an extremely compressed timeline necessarily calls for space assets to be resilient to errors and provide built-in reconfigurability. Adaptive control is a natural fit to provide these capabilities. Additionally, resilience to initial control errors enables the deployment of multiple spacecraft simultaneously with a smaller ground crew, as well as enabling the spacecraft to begin operation even if no ground communication is initially available.

While the invention has been described with reference to various embodiments, it will be understood by those skilled in the art that various changes may be made and equivalents may be substituted for elements thereof without departing from the scope of the invention. In addition, many modifications may be made to adapt a particular situation to the teachings of the invention without departing from the essential scope thereof. Therefore it is intended that the invention not be limited to the particular embodiment disclosed as the best mode contemplated for carrying out this invention.

The invention claimed is:

1. An adaptive control system for controlling a plant, comprising:
   a command filter that modifies a raw plant reference command to remove the effect of actuator saturation when a control limit is reached, said command filter outputting a filtered command and a time rate signal representing a time rate of said filtered command;
   a linear controller that outputs a linear control signal component, said linear control signal component being a function of said time rate signal and a command tracking error signal;
   control-reversal compensation means that output a nonlinear control signal component, said nonlinear control signal component being a function of said time rate signal and said command tracking error signal; and
   a summer for outputting an actuator command that is a sum of said linear and nonlinear control signal components.

2. The system as recited in claim 1, wherein said control-reversal compensation means comprise an integrator that outputs a signal representing a parameter r computed using the function $\int \phi \bar{\omega} dt$, where $\bar{\omega}$ is the command tracking error, $$\phi(\bar{\omega}, \dot{\omega}'_c) = -k\bar{\omega} + \dot{\omega}'_c$$

and $\dot{\omega}'_c$ is said time rate of said filtered command.

3. The system as recited in claim 2, wherein said control-reversal compensation means further comprise computing means connected to receive said parameter r signal from said integrator and a signal representing parameter $\phi$ from said linear controller, said computing means outputting said nonlinear control signal component in accordance with a function $\Phi r^2(\sin r)$.

4. The system as recited in claim 3, further comprising a deadzone switching element that prevents said integrator from receiving a signal representing the command tracking error $\bar{\omega}$ from said nonlinear controller when the magnitude of the command tracking error $\bar{\omega}$ is less than a predetermined threshold.

5. The system as recited in claim 3, further comprising a saturation element that receives said actuator command from said summer and passes it only if it has a magnitude within specified limits.

6. The system as recited in claim 5, wherein said saturation element outputs a clipped version of said actuator command when said actuator command has a magnitude greater than said limit.

7. The system as recited in claim 6, further comprising means for sending a signal to said command filter representing the product of a weighting factor and a difference between said actuator command and said clipped version of said actuator command, said weighting factor being a function of parameter r, and said command filter modifying said raw plant reference command as a function of said product.

8. The system as recited in claim 1, wherein said actuator is a reaction wheel aboard a spacecraft.

9. A method for adaptive control of a plant comprising the following steps:
   filtering a raw plant reference command to remove the effect of actuator saturation when a control limit is reached;
   outputting a filtered command and a time rate signal representing a time rate of said filtered command;
   generating a linear control signal component that is a function of said time rate signal and a command tracking error;
   computing a nonlinear function of an accumulated command tracking error;
   converting said nonlinear function into a nonlinear control signal component;
   summing said nonlinear control component and said linear control component to form an actuator command; and
   outputting said actuator command to an actuator of said plant.

10. The method as recited in claim 9, wherein said computing step uses a function $\int \phi \bar{\omega} dt$ to compute a parameter r, where $\bar{\omega}$ is the command tracking error, $$\phi(\bar{\omega}, \dot{\omega}'_c) = -k\bar{\omega} + \dot{\omega}'_c$$

and $\dot{\omega}'_c$ is said time rate of said filtered command.

11. The method as recited in claim 10, wherein said converting step converts respective signals representing the parameters r and $\Phi$ into said nonlinear control signal component in accordance with a function $\Phi r^2(\sin r)$.

12. The method as recited in claim 11, further comprising the step of clipping said actuator command if said actuator command has a magnitude greater than a limit.

13. The method as recited in claim 12, further comprising the steps of forming a signal representing a difference between said actuator command and said clipped actuator command.

14. The method as recited in claim 13, wherein said filtering step is performed as a function of the product of a weighting factor and said difference between said actuator command and said clipped actuator command, said weighting factor being a function of parameter r.

15. A spacecraft comprising a reaction wheel and an adaptive control signal processing system for controlling said spacecraft, said adaptive control signal processing system being programmed to perform the following steps:
   filtering a raw command reference to remove the effect of reaction wheel saturation when a control limit is reached;
   outputting a filtered command and a time rate signal representing a time rate of said filtered command;
   generating a linear control signal component that is a function of said time rate signal and a command tracking error;
   computing a nonlinear function of an accumulated command tracking error;
   converting said nonlinear function into a nonlinear control signal component;
   summing said linear and nonlinear control signal components to form a control signal; and
   outputting said control signal to said reaction wheel.

16. The spacecraft as recited in claim 15, further said adaptive control signal processing system is further programmed to clip said outputted control signal whenever its magnitude is greater than a limit, and to generate a signal representing a difference between said outputted control signal and said clipped control signal.

17. The spacecraft as recited in claim 15, wherein said computing step uses a function $\int\phi\omega dt$ to compute a parameter r, where $\omega$ is the command tracking error, $$\phi(\tilde{\omega},\dot{\omega}'_c)=-k\tilde{\omega}+\dot{\omega}'_c$$

and $\dot{\omega}'_c$ is said time rate of said filtered control signal.

18. The spacecraft as recited in claim 17, wherein said converting step converts respective signals representing the parameters r and $\Phi$ into said nonlinear control signal component in accordance with a function $\Phi r^2(\sin r)$.

19. The spacecraft as recited in claim 16, wherein said filtering step is performed as a function of the product of a weighting factor and said difference between said outputted control signal and said clipped control signal, said weighting factor being a function of parameter r.

20. The spacecraft as recited in claim 15, wherein said step of computing said nonlinear function of an accumulated command tracking error is not performed when the magnitude of the command tracking error $\tilde{\omega}$ is less than a predetermined threshold.

\* \* \* \* \*